(12) United States Patent
Nitzsche et al.

(10) Patent No.: US 8,429,281 B2
(45) Date of Patent: Apr. 23, 2013

(54) METHOD FOR OPERATING AN INDUSTRIAL AUTOMATION SYSTEM COMPRISING A PLURALITY OF NETWORKED COMPUTER UNITS, AND INDUSTRIAL AUTOMATION SYSTEM

(75) Inventors: Stefan Nitzsche, Frankenthal (DE); Frank Wigger, Karlsruhe (DE)

(73) Assignee: Siemens AG, Munich (DE)

( * ) Notice: Subject to any disclaimer, the term of this patent is extended or adjusted under 35 U.S.C. 154(b) by 661 days.

(21) Appl. No.: 12/650,982

(22) Filed: Dec. 31, 2009

(65) Prior Publication Data

US 2010/0174938 A1    Jul. 8, 2010

(30) Foreign Application Priority Data

Dec. 31, 2008   (EP) ..................... 08022538

(51) Int. Cl.
*G06F 15/16*     (2006.01)

(52) U.S. Cl.
USPC ........................................ 709/229

(58) Field of Classification Search .......... 709/220, 709/229; 700/19, 20, 108, 109, 110, 117
See application file for complete search history.

(56) References Cited

U.S. PATENT DOCUMENTS

| 6,748,429 B1 * | 6/2004 | Talluri et al. ................... 709/221 |
| 2005/0131954 A1 | 6/2005 | Heller et al. |
| 2006/0069452 A1 | 3/2006 | Pfister et al. |
| 2009/0172223 A1 * | 7/2009 | Lee et al. ..................... 710/104 |

FOREIGN PATENT DOCUMENTS

| DE | 102 29 879 | 11/2003 |
| EP | 1 643 679 | 4/2006 |
| EP | 1 710 647 | 10/2006 |
| WO | WO 03/056423 | 7/2003 |
| WO | WO 2007/110006 | 10/2007 |

* cited by examiner

*Primary Examiner* — Jerry Dennison
*Assistant Examiner* — Davoud Zand
(74) *Attorney, Agent, or Firm* — Cozen O'Connor

(57) ABSTRACT

An automation system comprising a plurality of networked computer units, functions of the automation system are provided by services of the computer units in which the services are configured and activated using system configuration data and service configuration data. The system configuration data comprise information for assigning services to providing computer units and for assigning dependencies between services. The system configuration data are accepted and checked by a first service of a control and monitoring unit of the automation system and are forwarded to target computer units. The system configuration data are checked by second services provided by the target computer units and are used to provide resources needed to activate local services. The service configuration data are transmitted to the target computer units following system configuration. A local service is activated by a target computer unit assigned to the service using the service configuration data.

10 Claims, 4 Drawing Sheets

METHOD FOR OPERATING AN INDUSTRIAL AUTOMATION SYSTEM COMPRISING A PLURALITY OF NETWORKED COMPUTER UNITS, AND INDUSTRIAL AUTOMATION SYSTEM

BACKGROUND OF THE INVENTION

The present invention relates to a method for operating an automation system comprising a plurality of networked computer units, and to the automation system.

Industrial automation systems are used to monitor, control and regulate technical processes, in particular in the field of production and process automation, and enable operation of machines and industrial installations which is intended to be performed as autonomously and independently of human intervention as possible. On account of the constantly increasing importance of information technology for automation systems comprising numerous networked computer units, methods for reliably configuring and activating distributed services for providing monitoring, controlling and regulating functions are gaining increasing importance. According to previous approaches to solutions, configuration data in distributed automation systems are provided by device-specific configuration systems and are used to activate a local service. In addition, the respective local service was previously immediately activated upon the provision of configuration data without further checking. In the case of distributed services whose service components are provided by a plurality of different computer units, uncoordinated configuration and activation of individual systems may result in problematic inconsistencies which jeopardize the fault-free provision of a service and have a disadvantageous effect on system stability and availability.

SUMMARY OF THE INVENTION

It is therefore an object of the present invention to provide an automation system and method for operating an automation system comprising a plurality of networked computer units which makes it possible to consistently and reliably provide distributed services.

This and other objects and advantages are achieved by a system and method in accordance with the invention in which functions of an automation system comprising a plurality of networked computer units are provided by services of the computer units. The services are configured and activated using system configuration data and service configuration data. The system configuration data comprise information for assigning services to providing computer units and for assigning dependencies between different services. The system configuration data are accepted and checked by a first service of a control and monitoring unit of the automation system and are forwarded to target computer units.

The control and monitoring unit may, for example, be an engineering system for configuring, maintaining, starting up and/or documenting the automation system. In accordance with the method of the invention, the system configuration data are checked by second services provided by the target computer units and are used to provide resources necessary for activating local services. The service configuration data are transmitted to the target computer units following successful system configuration. A local service is activated by a target computer unit assigned to the service using the service configuration data. On account of subdivision into the provision of system and service configuration data and service activation using checked configuration data which take into account service dependencies, the method in accordance with the invention makes it possible to reliably and consistently configure and activate services in an automation system.

In one preferred embodiment of the invention, the service configuration data are initially loaded in a preparation phase to activate a local service. The local service is then provided in a final phase using the service configuration data loaded in the preparation phase. If the preparation and/or final phase fail(s), the local service which may comprise, for example, service components distributed among a plurality of computer units is provided in a reset phase using service configuration data assigned to a last fault-free status. In this manner, partial failure of the acceptance of amended configuration data, in particular, cannot lead to service malfunctions because of inconsistent service configuration.

Configuration data needed at the run time are advantageously provided by the second services. This makes it possible, in particular if the first service fails, to still provide local services which are assigned an activated fault-free second service.

The system and service configuration data for all computer units of the automation system can be stored in a central database, whereas the system and configuration data for a selected computer unit can be stored in a local database assigned to the selected computer unit. As a result, it becomes advantageously possible to reliably access configuration data. The central database and local databases advantageously comprise version tables which are assigned to the respective system and service configuration data and are matched to one another. This also makes it possible to reliably and efficiently manage different versions of configuration data.

Access to configuration data for a local service can be made available either by the first service or by a second service assigned to the local service. If the second service assigned to the local service fails, access to configuration data for a local service is preferably made available by the first service. On the one hand, this makes it possible to quickly and efficiently distribute configuration data to target computer systems via second services assigned to the latter and, on the other hand, this enables increased fail safety by resorting to the first service when necessary.

Services of the automation system are preferably provided by the computer units within a service-oriented architecture. Service-oriented architectures (SOA) are aimed at structuring services in complex organizational units and making them available to a multiplicity of users. In this case, for example, existing components of a data processing system, such as programs, databases, servers or web sites, are coordinated such that acts provided by the components are combined to form services and are made available to authorized users. Service-oriented architectures enable application integration by hiding the complexity of individual subcomponents of a data processing system behind standardized interfaces. As a result, a particularly reliable and flexible control information is provided for a computer-based object in an automation system.

The automation system in accordance with the invention comprises a plurality of computer units which are connected to one another via a communication network and are intended to provide functions of the automation system in the form of services which can be configured and activated using system configuration data and service configuration data. Provision is also made of a control and monitoring unit for providing system configuration data which comprise information for assigning services to providing computer units and for assigning dependencies between services.

The automation system in accordance with the invention also includes a computer unit for providing a first service for accepting the system configuration data from the control and monitoring unit and for checking the system configuration data and forwarding the system configuration data to target computer units. At least one target computer unit is also provided for providing a second service for checking the system configuration data, for providing resources needed to activate local services and for activating a local service using the service configuration data. A system component for transmitting the service configuration data to the target computer units following successful system configuration is also provided, which system component may be assigned, for example, to the control and monitoring unit or to the computer unit for providing the first service.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in more detail below in an exemplary embodiment using the drawing, in which.

DETAILED DESCRIPTION OF THE PREFERRED EMBODIMENTS

Figure 1:
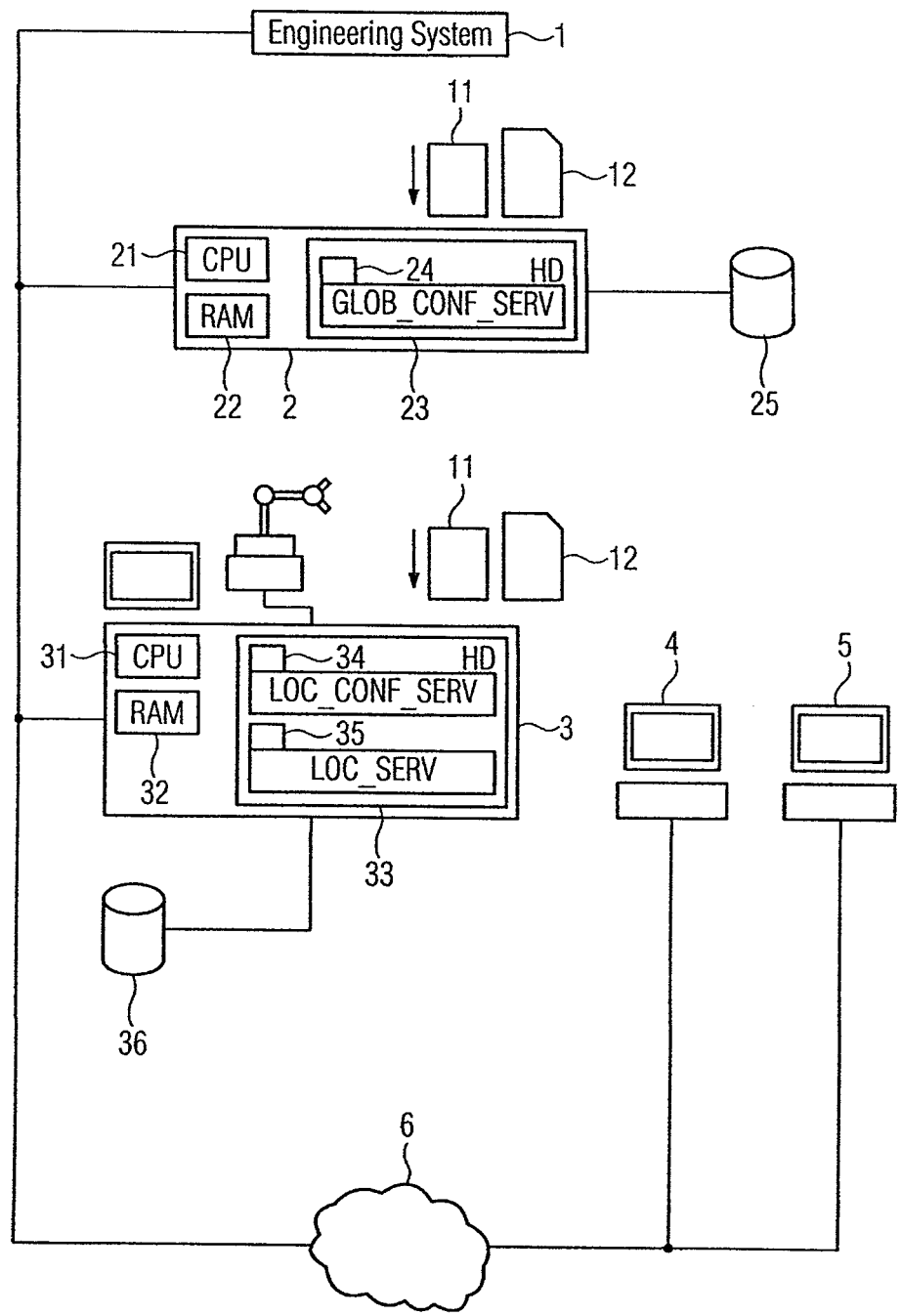
FIG. 1 is a diagrammatic illustration of an automation system having a plurality of computer units which are connected to one another via a communication network.

The automation system illustrated in FIG. 1 comprises an engineering system 1, a first computer unit 2 and a plurality of second computer units 3-5 which are connected to one another in the form of network nodes via a communication network 6. The second computer units 3-5 provide functions of the automation system in the form of local services which are configured and activated using system configuration data and service configuration data.

The engineering system 1 is used to configure, maintain, start up and document the automation system and provides system configuration data 11. The system configuration data 11 comprise information for assigning services to second computer units 3-5 and for assigning dependencies between services. The system configuration data 11 are transmitted to the first computer unit 2, checked by a global configuration and activation service provided by the first computer unit 2 and are forwarded to the respective second computer unit 3-5.

The system configuration data 11 are checked by local configuration and activation services provided by the second computer units 3-5 and are used to provide resources needed to activate local services. Following successful system configuration, the service configuration data 12 are transmitted from the engineering system 1 to the second computer units 3-5. The respective local service is activated by a local configuration and activation service assigned to the service using the service configuration data 12. Configuration data needed at the run time of the local services are also provided by the local configuration and activation services.

The first computer unit 2 and the second computer units 3-5 each comprise at least a processor 21, 31, a main memory 22, 32 and a hard disk 23, 33 for the non-volatile storage of program code, application data and user data. Program code 24 for providing the global configuration and activation service is stored on the hard disk 23 of the first computer unit 2. Program code 34 for providing a local configuration and activation service and program code 35 for providing a local service are also stored on the hard disk 33 of a second computer unit 3. In the present exemplary embodiment, the local service is used, for example, to control metrological or actuating peripherals such as sensors or robots. The program code 24, 34, 35 stored on the hard disks 23, 33 can be loaded into the main memory 22, 32 of the computer units 2, 3 and can be executed by the respective processor 21, 31 to provide the above services.

The system and service configuration data 11, 12 for all local services provided by the second computer units 3-5 are stored in a global database 25 of the first computer unit. System and service configuration data for a selected local service are additionally stored, for reasons of redundancy and performance, in a local database 36 of a second computer unit 3 which is assigned to the selected local service. Access to configuration data for a local service can be made available both by the global configuration and activation service and by a local configuration and activation service. If the respective local configuration and activation service fails, access to configuration data for a local service is preferably made available by the global configuration and activation service.

Figure 2:
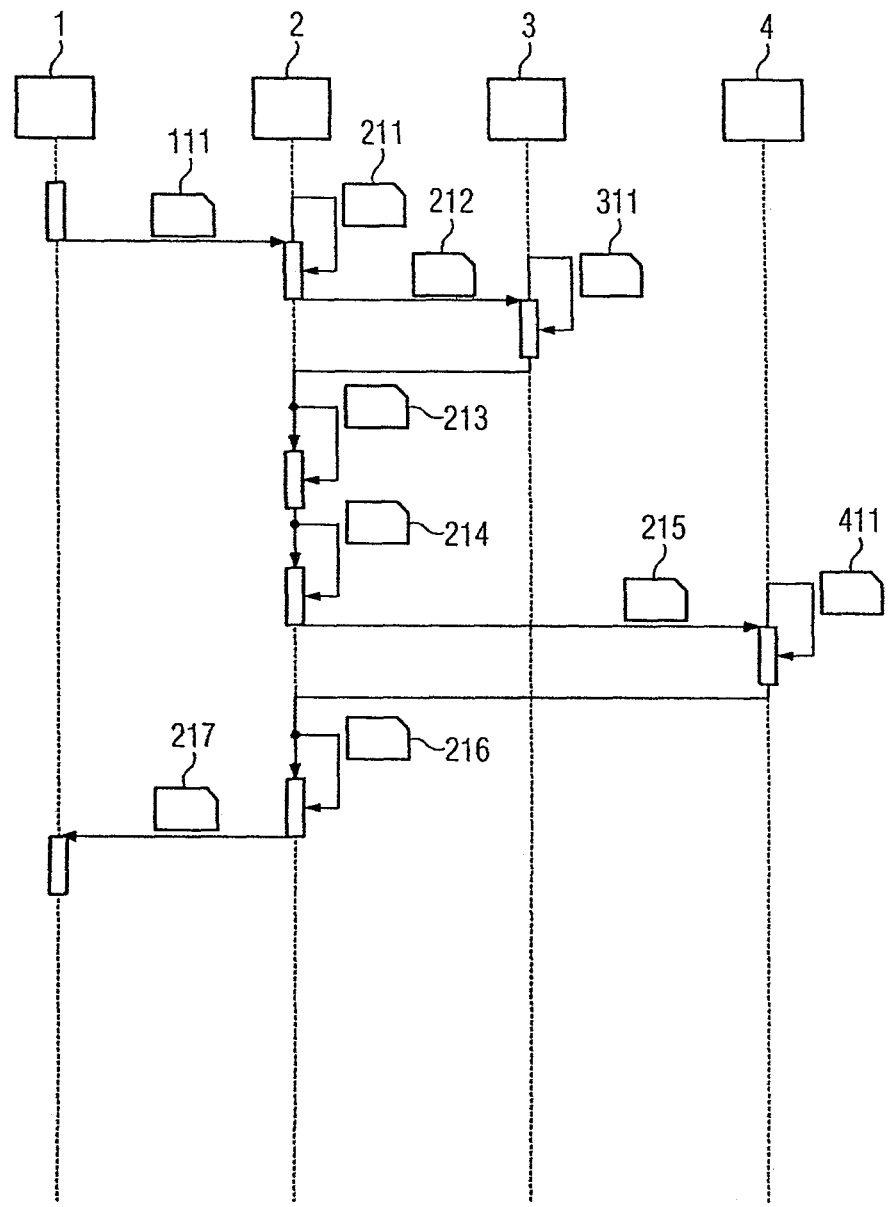
FIG. 2 is a diagram relating to the interchange of messages for providing target computer units with configuration data.
Figure 3:
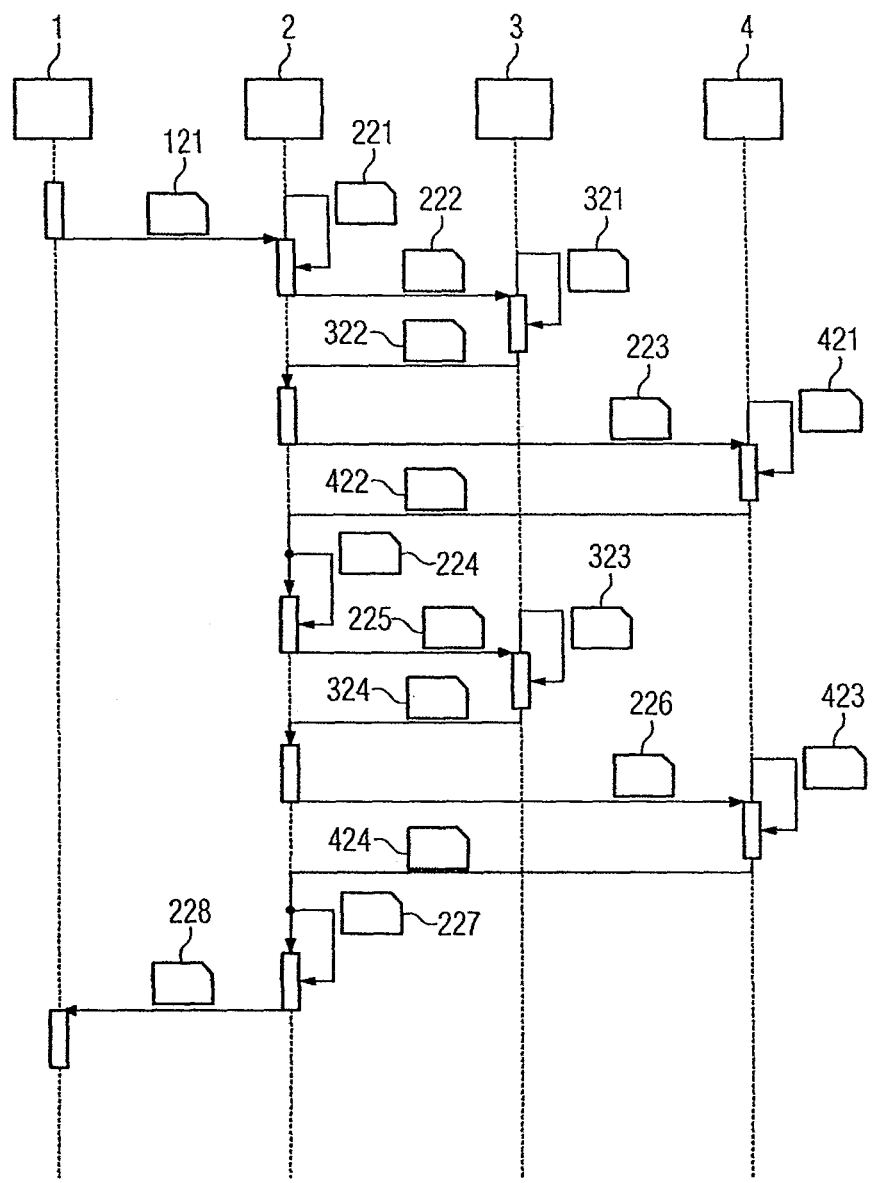
FIG. 3 is a diagram relating to the interchange of messages for activating local services using the configuration data which have been provided.

Since the provision and activation of configuration data are two separate steps, the interchange of messages for controlling the provision or activation is illustrated in a respective separate diagram according to FIGS. 2 and 3. The messages illustrated in FIGS. 2 and 3 also comprise internal messages which are interchanged between computer-based objects of a run-time system and are intended to initiate function calls.

With reference to FIG. 2, a message 111 containing the configuration data to be provided is initially transmitted from the engineering system 1 to the first computer unit 2 to provide the configuration data. The performance of a consistency check on the transmitted configuration data is then requested in the first computer unit 2 for each message 211. If the consistency check is successful, the first computer unit 2 transmits a message 212 containing the checked configuration data to a second computer unit 3 which provides a first local service.

The global database and the local databases comprise version tables which are assigned to the respective system and service configuration data and are matched to one another. For this reason, after the configuration data have been received by the computer unit 3 which provides the first local service, an update of the version table located therein is requested for each message 311.

If the update is successful, an update of the version table stored in the global database is requested using a message 213. In the present exemplary embodiment, a consistency check for configuration data intended for a further second computer unit 4 which makes available a second local service is then requested for each message 214. If the consistency check is successful, a message 215 containing the checked configuration data is transmitted to the further second computer unit 4. In a similar manner to the above procedure, an update of the version table stored in the local database of the further second computer unit 4 is requested for each message 411. If the update is successful, an update of the version table stored in the global database is then requested using a message 216. If this is also successful, the first computer unit 2 finally transmits a message 217 to the engineering system 1 relating to successful provision of the configuration data for the first and second local services.

With reference to FIG. 3, a message 121 is initially transmitted from the engineering system 1 to the first computer unit 2 to activate the configuration data. The first computer unit 2 then checks, for each message 221, whether configuration data have been provided for activation. If configuration data are available for activation, the first computer unit 2 transmits a message 222 to the second computer unit 3 to initiate a preparation phase for loading the service configuration data. The second computer unit 3 causes the preparation phase to be initiated using a message 321 and, if the preparation phase is successful, transmits a message 322 relating this to the first computer unit 2.

In a similar manner, a preparation phase for loading the service configuration data is initiated using a message 223 which is addressed to the further second computer unit 4. Based on the above statements, the further second computer unit 4 causes the preparation phase to be initiated using a message 421 and, if the preparation phase is successful, transmits a corresponding message 422 to the first computer unit 2. A message 224 for combining and checking results of the individual preparation phases is then transmitted to the first computer unit 2.

After the preparation phases have been successfully concluded, a message 225 is transmitted to the second computer unit 3 to initiate a final phase or commit phase. The second computer unit 3 uses a message 323 to cause the first local service to be provided in a final phase using the service configuration data loaded in the preparation phase. If the final phase is successful, the second computer unit 3 transmits a confirmation message 324 to the first computer unit 2.

In a similar manner, a message 226 is transmitted to the further second computer unit 4 to initiate a final phase for the further second computer unit 4. The further second computer unit 4 uses a message 423 to cause the second local service to be provided in a final phase using the service configuration data loaded in the preparation phase. If the final phase is successful, the further second computer unit 4 transmits a corresponding confirmation message 424 to the first computer unit 2.

A message 227 for combining and checking results of the individual final phases is finally transmitted to the first computer unit 2. If the final phases have been successfully concluded, the first computer unit 2 transmits a message 228 relating to successful activation of the first and second local services to the engineering system 1.

If the preparation or final phase fails, the first and second local services are provided in a reset phase using service configuration data assigned to a last fault-free status. This is effected using version information stored in version tables. The system and service configuration data for all computer units of the automation system are preferably stored in the global database 25 of the first computer unit 2. The system and service configuration data for a selected computer unit may additionally be stored in a local database assigned to the selected computer unit. The central database and any local databases comprise version tables which are assigned to the respective system and service configuration data stored there and are matched to one another.

Figure 4:
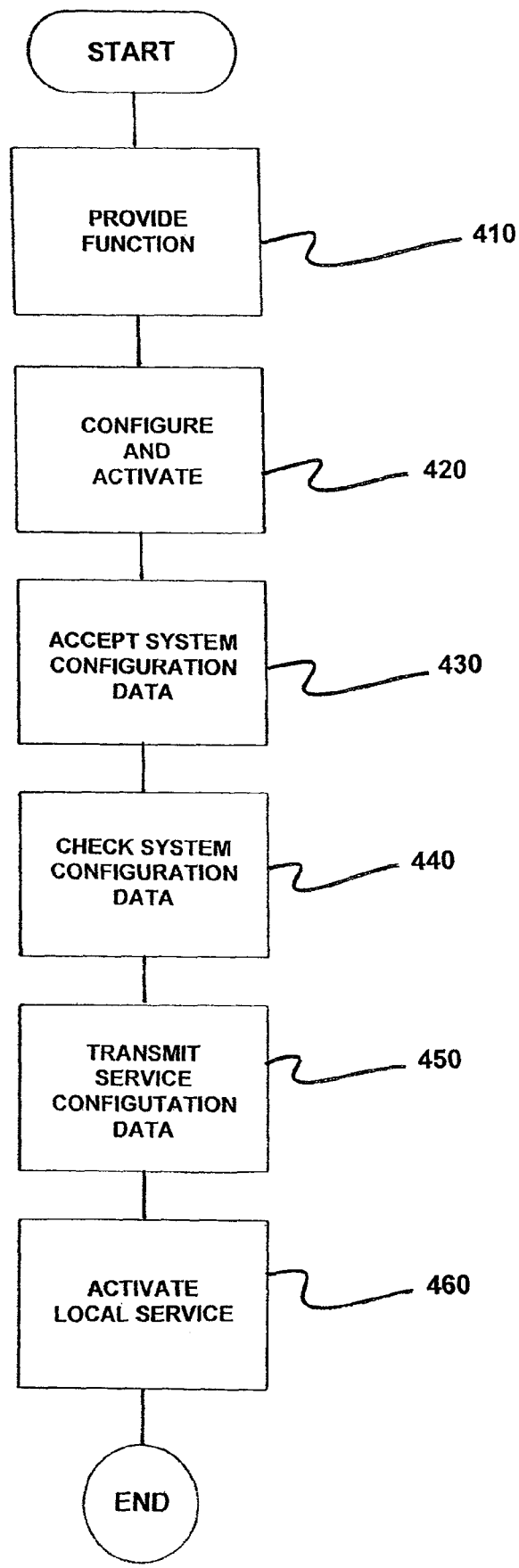
FIG. 4 is a flow chart of the method in accordance with an embodiment of the invention.

FIG. 4 is a flow chart illustrating the method in accordance with the invention. Functions of the automation system are provided by services of the plurality of networked computer units, as indicated in step 410. The services are configured and activated using system configuration data and service configuration data, as indicated in step 420. Here, the system configuration data comprises information for assigning services to each of said plural computer units providing services computer units and for assigning dependencies between assigned services.

The system configuration data are accepted and checked by a first service of a control and monitoring unit of the automation system and forwarding the system configuration data to target computer units, as indicated in step 430. The system configuration data are checked by second services provided by the target computer units and are the system configuration data are used to provide necessary resources for activating local services, as indicated in step 440.

Next, the service configuration data are transmitted to the target computer units following successful system configuration, as indicated in step 450. A local service is activated by a target computer unit assigned to the local service using the service configuration data, as indicated in step 460.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for operating an industrial automation system comprising a plurality of networked computer units, comprising:

providing functions of the industrial automation system by services of the plurality of networked computer units;

configuring and activating the services using system configuration data and service configuration data, the system configuration data comprising information for assigning services to service providing computer units of said plural computer units and for assigning dependencies between assigned services;

accepting and checking the system configuration data by a first service of a control and monitoring unit of the automation system and forwarding the system configuration data to target computer units of the plural computer units;

checking the system configuration data by second services provided by the target computer units and using the system configuration data to provide necessary resources for activating local services;

transmitting the service configuration data to the target computer units following successful system configuration; and activating a local service by one of the target computer units assigned to said local service using the service configuration data;

wherein the service configuration data are initially loaded in a preparation phase to activate a local service and the local service is provided in a final phase using the service configuration data loaded in the preparation phase, and wherein if at least one of the preparation phase and the final phase fails, the local service is provided in a reset phase using service configuration data assigned to a last fault-free status.

2. The method as claimed in claim 1, wherein the local service comprises service components distributed among the plurality of computer units.

3. The method as claimed in claim 1, wherein configuration data needed at run time are provided by the second services.

4. The method as claimed in claim 1, wherein the system configuration data and service configuration data for all of the computer units of the automation system are stored in a central database, and wherein the system configuration data and service configuration data for a selected one of the computer units are stored in a local database assigned to the one of the selected computer units.

5. The method as claimed in claim 4, wherein the central database and local databases comprise version tables which are assigned to a stored respective system configuration data and service configuration data and are matched to one another.

6. The method as claimed in claim 1, wherein access to service configuration data for a local service is made available by one of the first service and the one of the second services that is assigned to the local service.

7. The method as claimed in claim 6, wherein, if the one of the second services assigned to the local service fails, access to service configuration data for a local service is made available by the first service.

8. The method as claimed in claim 1, wherein the services of the industrial automation system are provided by the plurality of computer units within a service-oriented architecture.

9. The method as claimed in claim 1, wherein the control and monitoring unit is an engineering system for at least one of configuring, maintaining, starting up and documenting the industrial automation system.

10. An industrial automation system, comprising:
a plurality of computer units connected to one another through a communication network and configured to provide functions of the industrial automation system in the form of services configurable and activatable using system configuration data and service configuration data;
a control and monitoring unit configured to provide the system configuration data which comprise information for assigning services to service providing computer units of the plural computer units and for assigning dependencies between services;
wherein one of the computer units is configured to provide a first service for accepting the system configuration data from the control and monitoring unit and configured to check the system configuration data and forward the system configuration data to target computer units of the plural computer units;
at least one of the target computer units is configured to provide a second service for checking the received system configuration data, provide resources necessary for activating local services and for activating a local service using the service configuration data; and
a system component configured to transmit the service configuration data to the target computer units following successful system configuration;
wherein the industrial automation system is configured to:
initially load the service configuration data in a preparation phase to activate a local service and provide the local service in a final phase using the service configuration data loaded in the preparation phase; and
wherein the industrial automation system is further configured to:
provide the local service in a reset phase using service configuration data assigned to a last fault-free status if at least one of the preparation phase and the final phase fails.

* * * * *